US010617977B2

(12) United States Patent
Roach et al.

(10) Patent No.: US 10,617,977 B2
(45) Date of Patent: Apr. 14, 2020

(54) OUTSIDE-IN WATER PURIFICATION SYSTEM

(71) Applicant: Goodrich Corporation, Charlotte, NC (US)

(72) Inventors: Kevin Edward Roach, Stow, OH (US); Michael Anthony Ziska, Cuyahoga Falls, OH (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 15/844,001

(22) Filed: Dec. 15, 2017

(65) Prior Publication Data
US 2019/0184314 A1 Jun. 20, 2019

(51) Int. Cl.
*B01D 29/17* (2006.01)
*C02F 1/00* (2006.01)
*B01D 29/11* (2006.01)

(52) U.S. Cl.
CPC ............ *B01D 29/17* (2013.01); *B01D 29/114* (2013.01); *C02F 1/001* (2013.01); *B01D 2201/295* (2013.01); *B01D 2201/34* (2013.01); *B01D 2201/347* (2013.01); *B01D 2201/44* (2013.01); *C02F 2201/004* (2013.01); *C02F 2201/006* (2013.01)

(58) Field of Classification Search
CPC ................ B01D 29/17; B01D 2201/34; B01D 2201/44; C02F 1/001
USPC .... 210/434, 435, 444, 439, 446, 493.2, 450, 210/232
See application file for complete search history.

(56) References Cited

U.S. PATENT DOCUMENTS

| 3,696,932 | A | 10/1972 | Rosenberg |
| 4,828,698 | A | 5/1989 | Jewell et al. |
| 5,830,360 | A | 11/1998 | Mozayeni |
| 8,678,201 | B2 | 3/2014 | Hu |
| 9,216,368 | B1 | 12/2015 | Williams et al. |
| 9,546,472 | B2 | 1/2017 | Burd |

(Continued)

FOREIGN PATENT DOCUMENTS

| GB | 2437279 A | 10/2007 |
| WO | WO9910076 A1 | 3/1999 |

OTHER PUBLICATIONS

Extended European Search Report for EP Application No. 18213162.3, dated Apr. 2, 2019, pp. 7.

(Continued)

*Primary Examiner* — Madeline Gonzalez
(74) *Attorney, Agent, or Firm* — Kinney & Lange, P.A.

(57) ABSTRACT

An outside-in liquid purification system includes a housing and a cartridge. The housing defines an interior space and includes an inlet, an outlet, walls extending between a top side and a bottom side, and an unfiltered volume. The cartridge is disposed within the interior space and includes a top cap adjacent the top side of the housing configured to direct liquid that enters the interior space to the unfiltered volume and a filter having an annular shape and extending between the top cap and the bottom side of the housing such that no portion of the unfiltered volume is below the filter with the filter defining a hollow vertical column such that liquid flows from the unfiltered volume through the filter into the column and then downward out of the housing through the outlet.

20 Claims, 2 Drawing Sheets

(56) References Cited

U.S. PATENT DOCUMENTS

2005/0145558 A1* 7/2005 Ciak ............... B01D 35/143
                                              210/420
2008/0110820 A1   5/2008 Knipmeyer et al.

OTHER PUBLICATIONS

Extended European Search Report for EP Application No. 18213116.9, dated Apr. 2, 2019, pp. 7.

* cited by examiner

OUTSIDE-IN WATER PURIFICATION SYSTEM

BACKGROUND

The present disclosure relates to a water purification system and, in particular, to an outside-in water purification system utilized when the water source is placed above the water purification system.

Water purification systems, also known as water purifiers, are utilized in various applications to remove impurities and/or odors from water within water systems. On large passenger vehicles, such as aircraft, at least one water purifier within the water system is utilized to purify the water as the water flows from a water source, such as a tank, to a water faucet or other water dispensing unit. When the aircraft is not in use for an extended period of time, or when the aircraft will be or is parked in below-freezing conditions, it is necessary to fully drain the water from the water system (including the water purifier) to maintain sanitary conditions and prevent components from damage caused by the freezing of the water. Thus, it is important that all water is drained from the purifier. Current water treatment units; such as water purifiers, water filters, and ultraviolet sterilizers; use drain lines to drain the water out of areas of the water purifier that are below the outlet, where water is able to sit/pool in low lying areas and is unable to flow through an outlet of the water purifier through gravity alone. However, these drain lines increase the weight of the system, which decreases the efficiency of the vehicle. Further, the drain lines increase the complexity and the number of components, resulting in a system that is more likely to break down. Thus, a water purifier that is configured to allow water to drain from the system without the need for drain lines is advantageous.

SUMMARY

An outside-in liquid purification/filtration system includes a housing and a cartridge. The housing defines an interior space and includes an inlet at a top side of the housing, an outlet at a bottom side of the housing, walls extending between the top side and the bottom side, and an unfiltered volume within the interior space. The cartridge is disposed within the interior space and includes a top cap adjacent the top side of the housing configured to direct liquid that enters the interior space to the unfiltered volume and a filter having an annular shape and extending between the top cap and the bottom side of the housing such that no portion of the unfiltered volume is below the filter. Further, the filter defines a hollow vertical column such that liquid flows from the unfiltered volume through the filter into the column and then downward out of the housing through the outlet.

A water purification/filtration system includes a housing and a cartridge. The housing defines an interior space with an inlet at a top side, an outlet at a bottom side, and an unfiltered volume adjacent walls extending between the top side and the bottom side. The cartridge within the housing has a top cap and a filter between the top cap and the bottom of the housing such that no portion of the unfiltered volume is below the filter with the filter having an annular shape defining a hollow vertical column that allows water to flow from the unfiltered volume at least partially radially inward through the filter into the column and downward out through the outlet.

DETAILED DESCRIPTION

Figure 1A:
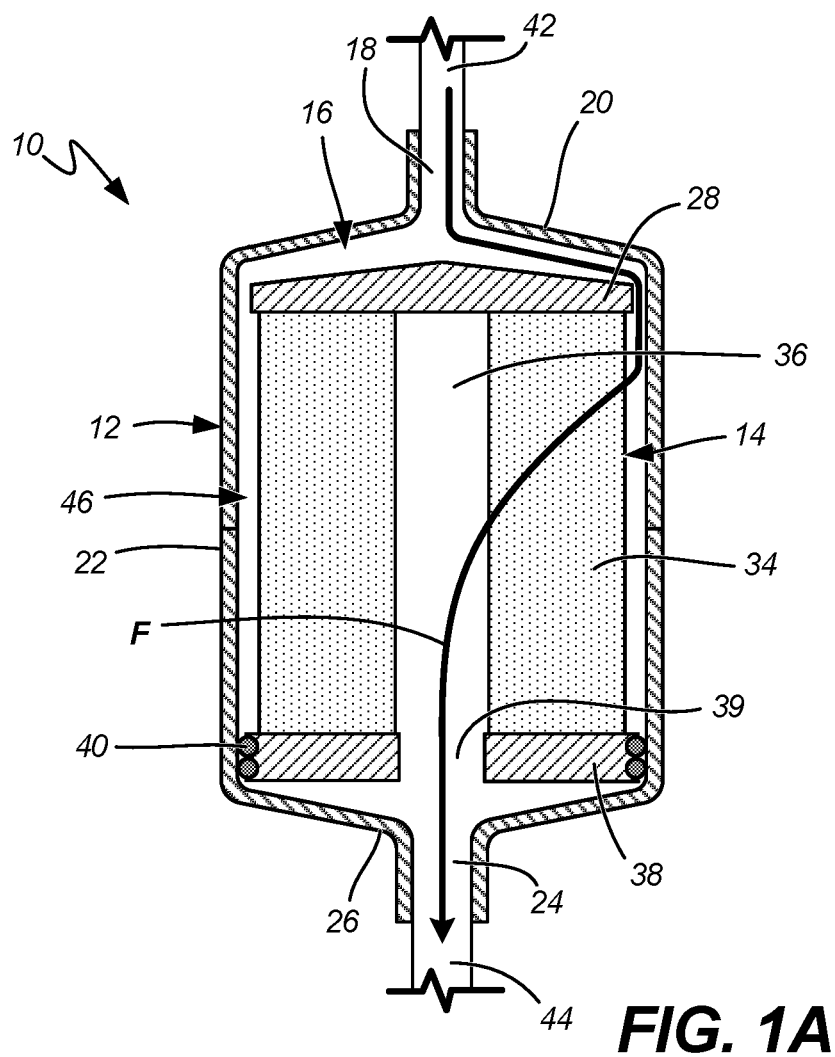
FIG. 1A is a cross-sectional side view of a water purification system.

An outside-in liquid purification system includes a housing to contain the system and a cartridge within the housing to filter/purify the liquid flowing through the purification system. When discussing the liquid purification system, the liquid is often times water, but the disclosed configuration can be utilized to purify other liquids. Thus, the use of water and liquid in this description should be taken as being interchangeable with one another. Further, when describing the outside-in liquid purification system, the disclosure may also refer to this system as a water purifier and/or a liquid purifier. The purification system is classified as an outside-in system because unfiltered water is directed to a radially outer unfiltered volume adjacent the walls (an "outside" of the filter) and flows at least partially radially inward through the filter to become filtered/purified ("in" to the filter) before exiting the housing through an outlet.

While water filtration and purification require different means to remove impurities from the water and are aimed at removing different and/or additional types of impurities, this disclosure uses the two terms interchangeably as the water filtration/purification system described herein can be utilized for either purpose (or both purposes simultaneously depending on the filter used). Thus, while the disclosure and claims describe a "purification" system, it should be understood to also include a "filtration" system, and while the disclosure and claims describe the use of a "filter," it should be understood that a different component can be used in place of the filter to purify the water.

The housing defines an interior space and includes an inlet at a top side of the housing and an outlet at a bottom side of the housing. Walls of the housing extend between the top side and the bottom side. Within the interior space of the housing is a cartridge having a top cap adjacent the top side of the housing and a filter extending between the top cap and the bottom side of the housing. The space between the cartridge and the walls of the housing form an unfiltered volume within which unfiltered/unpurified liquid (such as water) that enters through the inlet in the housing can be present. To filter/purify the liquid, the unfiltered/unpurified liquid then flows at least partially radially inward through the filter of the cartridge into a hollow vertical column at a center of the filter (hence, the liquid flows "outside-in"). With the liquid within the column being filtered/purified, the liquid is allowed to flow out of the housing through the outlet. An advantage of this outside-in liquid purification system is that the filter is configured adjacent to the bottom side of the housing such that no portion of the unfiltered volume is below the filter. With all of the unfiltered/unpurified liquid within the unfiltered volume adjacent the filter and forced to flow through the filter, there is no portion of the unfiltered volume within which unfiltered/unpurified liquid can sit when the liquid is allowed to drain (by gravity) from the housing. Thus, the outside-in purification system is configured so as to prevent water from remaining within the housing and freezing or creating unsanitary conditions after the system has been shut off.

Figure 1B:
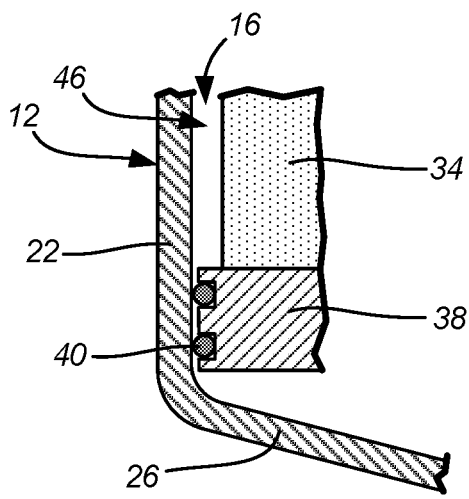
FIG. 1B is an enlarged cross-sectional side view of a bottom portion of the water purification system.

FIG. 1A is a cross-sectional side view of water purification system 10 (also referred to as a water purifier or a liquid purifier), while FIG. 1B is an enlarged cross-sectional side view of a bottom portion of water purification system 10. Water purification system 10 includes housing 12 and cartridge 14. Housing 12 forms interior space 16 and includes inlet 18 at top side 20, walls 22, and outlet 24 at bottom side 26. Cartridge 14 includes top cap 28, filter 34 with column 36, and bottom cap 38 with orifice 39. Between bottom cap 38 and housing 12 near bottom side 26 are sealing rings 40. Connected to housing 12 at inlet 18 is inlet hose 42, and connected to housing 12 at outlet 24 is outlet hose 44. Between walls 22 of housing 12 and cartridge 14 is unfiltered volume 46. Flow path F shows a path water takes through water purification system 10.

Housing 12 is the primary structural component of water purification system 10 and provides interior space 16 within which cartridge 14 is located and through which any water intending to be filtered/purified will flow. Housing 12 can be substantially cylindrical in shape with a conically shaped top side 20, conically shaped bottom side 26, and annular walls 22 extending between top side 20 and bottom side 26. While shown as substantially cylindrical, housing 12 can have any shape suitable to contain cartridge 14 (and water) and provide interior space 16. Housing 12 can be configured to be separable into at least two pieces, such as a top portion and a bottom portion, to allow access to interior space 16 to allow for the installation and removal of cartridge 14. The point at which housing 12 separates can be anywhere along housing 12, such as at a vertical middle as shown in FIG. 1A, closer to top side 20, or closer to bottom side 26. Additionally, housing 12 can be permanently sealed shut such that replacement of cartridge 14 entails replacement of water purification system 10. Housing 12 can be constructed from a variety of materials, including a metal, plastic, or a composite material.

Housing 12 further includes inlet 18 in top side 20 that is connectable to inlet hose 42, which in turn is connected to a water source for providing unpurified/unfiltered water to water purification system 10. Inlet 18 can be located at a radial center of top side 20 or another location, such as closer to or at walls 22 of housing 12.

At bottom side 26 is outlet 24, which is connectable to outlet hose 44. Outlet 24 allows purified/filtered water to exit interior space 16 and flow through outlet hose 44 to a faucet or other water dispensing unit. Bottom side 26 of housing 12 can have any shape, but a conical configuration that utilizes gravity to aid the flow of purified/filtered water out of interior space 16 is shown in FIGS. 1A and 1B. Outlet 24 in bottom side 26 can be vertically aligned with orifice 39 in bottom cap 38 to allow the filtered/purified water to flow directly from column 36, through orifice 39, and out of housing 12 through outlet 24.

Cartridge 14 is within interior space 16 of housing 12, but can be configured to be removed and replaced when needed. Cartridge 14 is cylindrical in shape to fit within the corresponding cylindrical interior space 16 of housing 12. However, cartridge 14 can be configured to have another shape. In FIGS. 1A and 1B, cartridge 14 is held in place within interior space 16 by sealing rings 40 firmly holding bottom cap 38 adjacent to walls 22 near bottom side 26 of housing 12. Cartridge 14 can also be held in place by downward extending fingers on a bottom side of bottom cap 38 that are abutting bottom side 26 of housing 12. While also holding bottom cap 28 (and the rest of cartridge 14) in place adjacent walls 22 near bottom side 26, sealing rings 40 prevent unfiltered water from flowing downward out of outlet 24 without first flowing through filter 34. While bottom cap 38 can include fingers, the fingers may not be necessary as sealing rings 40 may be sufficient to hold cartridge 14 in place. As will be described in greater detail below, other features and/or configurations of housing 12 and/or bottom cap 38 can be utilized to ensure cartridge remains adjacent bottom side 26 of housing 12.

Between cartridge 14 and walls 22 of housing 12 is unfiltered volume 46, within which unfiltered water that enters through inlet 18 can be present before flowing through filter 34. Unfiltered volume 46 can be as large or small as needed. However, as will be described below, housing 12 and cartridge 14 provide a configuration in which no portion of unfiltered volume 46 is present below filter 34 of cartridge 14 to provide no volume within housing 12 where unfiltered water can pool/sit.

Top cap 28 is at a top of cartridge 14 adjacent top side 20 of housing 12 and directs water that enters interior space 16 into unfiltered volume 46 adjacent walls 22. Top cap 28 is above filter 34 and column 36 and provides structural support to the components of cartridge 14 while preventing the unfiltered/unpurified water from entering column 36 without first passing through filter 34. Top cap 28 can have a variety of shapes and/or features configured to guide the water entering through inlet 18 radially outward towards walls 22. For example, top cap 28 can have a top side with a conical shape as shown in FIG. 1A, can be a disk with a flat top side, can have a domed or prismatic top side, or can have an asymmetrically sloped top side. Top cap 28 can be as vertically tall/wide or short/thin as necessary to prevent water from entering column 36 and provide support to the other components of cartridge 14.

Between top cap 28 and bottom cap 38 is filter 34, which is cylindrical in shape and includes column 36 at a center. Filter 34 is made up of a filter medium, which can be a pleated media that has an annular fan-like configuration constructed from any known water filtering/purifying medium. Additionally, the filter medium forming filter 34 can be a particulate medium or some other configuration, such as with a carbon particle filter. While filter 34 is described as a pleated media that has a fan-like configuration, filter 34 can be configured as a spiral or have concentric rings.

Column 36 is a hollow vertical cylindrically-shaped void at the center of filter 34 that provides a volume in which filtered/purified water can be present after flowing at least partially radially inward through filter 34 to be filtered/purified (i.e., an outside-in filtration/purification configuration) before exiting cartridge 14 through bottom cap 38. An outside-in filtration/purification configuration may be advantageous because the fan-like configuration (a zig-zag pattern of pleated media when viewed from the top downwards) of the filter allows the unfiltered/unpurified water to flow through a filter medium at a point where the filter medium is spaced apart from one another a greater distance than the filter medium near column 36. This fan-like configuration allows a greater volume for the particulate/impurities being filtered out of the water to accumulate, thereby possibly increasing the life cycle of filter 34 because filter 34 may not become clogged as quickly as other configurations. While filter 34 is shown having a cylindrical shape with column 36 at the center, filter 34 can have other configurations. While filter 34 is described as a fluid filter, the disclosed configuration could include a purification medium instead of a filter or in addition to a filter medium.

Bottom cap 38 is an annular disk having orifice 39 at a center. Bottom cap 38 is adjacent bottom side 26 of housing 12 and provides structural support to cartridge 14. Orifice 39 can be centered upwards from outlet 24 to allow filtered/purified water within column 36 to exit cartridge 14 through orifice 39 and then exit housing 12 easily through outlet 24. Bottom cap 36 can be as vertically tall/wide or short/thin as necessary to provide support to the other components of cartridge 14 and prevent water from flowing downward towards bottom side 26 except through orifice 39 of bottom cap 36. Further, bottom cap 36 can have downward extending fingers or another configuration to support cartridge 14 in relation to bottom side 26 of housing 12. While bottom cap 38 is shown as an annular end cap that extends radially/laterally outward to or past filter 34, bottom cap 38 can have other configurations. In the embodiment of water purification system 10 shown in FIGS. 1A and 1B, bottom cap 38 extends laterally outward past filter 34 to be adjacent to and in contact with walls 22 so that no portion of unfiltered volume 46 extends below the downward-most point of filter 34 so that no unfiltered water can sit and pool within unfiltered volume 46 when water is no longer supplied to water purification system 10 (i.e., the overall water system is shut off). Filter 34 can be fastened to bottom cap 36 through a variety of configurations. One configuration can include the use of adhesive. Another configuration can include bottom cap 36 having slots into which the fan-like medium slides into. A further configuration can include bottom cap 36 being constructed from a material that becomes at least partially soft from heat and filter 34 being pressed into and embedded in bottom cap 36 with bottom cap 36 then allowed to cool and harden (and bond) to filter 34. However filter 34 and bottom cap 36 are fastened to one another, the connection should be substantially water tight such that water cannot flow between filter 34 and bottom cap 36 and rather must flow through filter 34 to become filtered/purified.

Sealing rings 40 are annular components between bottom cap 36 and walls 22 of housing 12 to prevent unfiltered/unpurified water from flowing between the two. While shown as two sealing rings 40 in FIGS. 1A and 1B, water purification system 10 can have no sealing rings (as shown in FIGS. 2C and 2D), one sealing ring 40, or more than two sealing rings to ensure unfiltered/unpurified water cannot flow out of unfiltered volume 46 except through filter 34. Sealing rings 40 can be constructed from any material that is able to span and fill a gap between bottom cap 36 and walls 22. Bottom cap 36 can include one or multiple grooves to accommodate sealing rings 40.

As shown in FIG. 1A, flow path F of water through water purification system 10 begins by entering interior space 16 of housing 12 through inlet 18, with unfiltered/unpurified water being provided to inlet 18 from a water source by inlet hose 42. After entering interior space 16, unfiltered/unpurified water is directed into unfiltered volume 46 adjacent walls 22 by top cap 28. From unfiltered volume 46, the unfiltered/unpurified water flows at least partially radially inward through filter 34 into column 36 to become filtered/purified. From column 36, the filtered/purified water flows downward through orifice in bottom cap 38 and then out of interior space 16 of housing 12 through outlet 24. The filtered/purified water then is able to flow through outlet hose 44 to a faucet or other water dispensing means. As described above, the unfiltered/unpurified water is not allowed to sit/pool at a bottom of unfiltered volume 46 when water is not provided to water purification system 10 because bottom cap 38 extends an entire lateral distance between walls 22 of housing 12 such that no portion of unfiltered volume 46 is below the bottom of filter 34. While the embodiment of water purification system 10 shown in FIGS. 1A and 1B show bottom cap 38 extending laterally between walls 22 with sealing rings 40 therebetween to seal bottom cap 38 to walls 22, other embodiments can be configured to ensure no portion of unfiltered volume 46 is below filter 34.

Figure 2A:
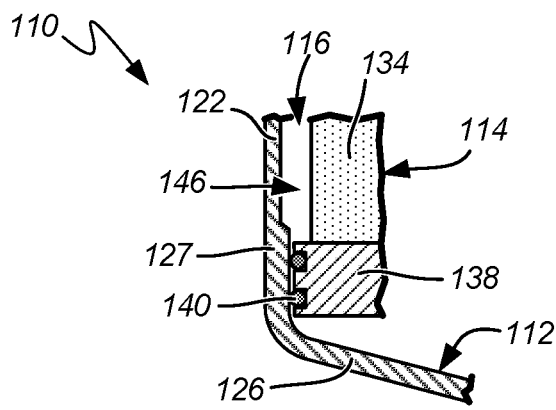
FIG. 2A is an enlarged cross-sectional side view of a second embodiment of the water purification system.

FIG. 2A is an enlarged cross-sectional view of a bottom portion of water purification system 110, which is similar to water purification system 10 shown in FIGS. 1A and 1B. Water purification system 110 includes all of the components disclosed in water purification 10, except the components discussed with regards to water purification 110 are different than those in water purification system 10 in FIGS. 1A and 1B. Water purification system 110 includes housing 112 having interior space 116, walls 122, bottom side 126, and stair-step 127 (among other components) and cartridge 114 having filter 134 and bottom cap 138 (among other components). Water purification system 110 also includes ring seals 140 and unfiltered volume 146.

Housing 112 includes stair-step 127 at a location where bottom cap 138 and sealing rings 140 interface with walls 122 of housing 112. Stair-step 127 is a radially/laterally inward extending portion of housing 112 (i.e., extends radially inward a greater amount than walls 122 such that an inner diameter of walls 122 is greater than an inner diameter of stair-step 127). Housing 112 can be configured such that a thickness of housing 112 at stair-step 127 is greater so that an outside diameter of housing 112 is constant, or housing 112 can be a constant thickness such that the stair-step 127 also results in the outside diameter of housing 112 having a stair-step inverse to stair-step 127.

Cartridge 114 is similar to cartridge 14 except that bottom cap 138 extends laterally less than bottom cap 38 of cartridge 14 (i.e., bottom cap 138 is a smaller annular disk than bottom cap 38). Bottom cap 138 extends laterally to be adjacent to and seal with stair-step 127 of housing 112 to prevent water from flowing between housing 112 and bottom cap 138.

Water purification system 110 includes stair-step 127 so that during installation bottom cap 138 and seal rings 140 only need to slide a small vertical length while in contact with housing 112 to be in place adjacent stair-step 127. Without stair-step 127, bottom cap 138 and seal rings 140 would need to slide along and in contact with the entire vertical length of walls 22 to be in place adjacent bottom side 126. Because the risk of sealing rings 140 and bottom cap 138 becoming damaged is increased the greater the distance the two components slide along in contact with housing 112 (at walls 122), stair-step 127 ensures sealing rings 140 and bottom cap 138 only need to slide a small distance in contact with housing 112 (at stair-step 127) and aids in preventing those components from becoming damaged. Because bottom cap 138 is still between filter 134 and bottom side 126 and extends laterally between stair-step 127 of housing 127, no portion of unfiltered volume 146 is below filter 134 and unfiltered/unpurified water is prevented from sitting/pooling within unfiltered volume 146 when the system is shut off and allowed to drain.

Figure 2B:
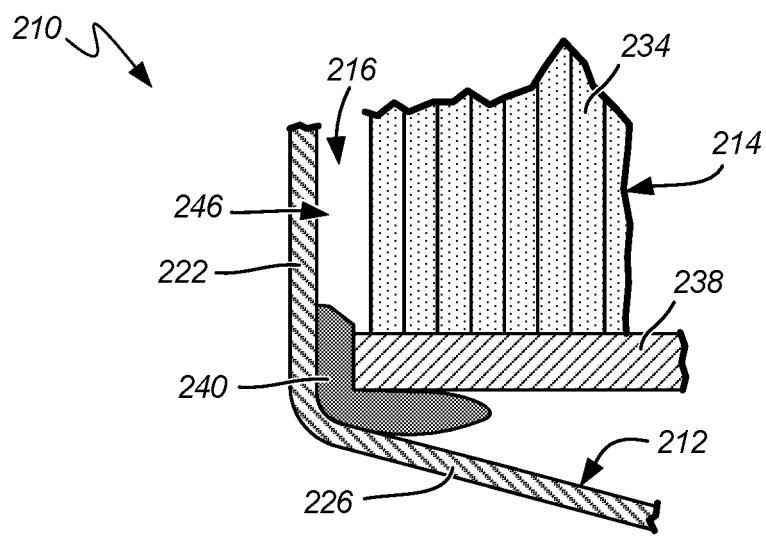
FIG. 2B is an enlarged cross-sectional side view of a third embodiment of the water purification system.
Figure 2C:
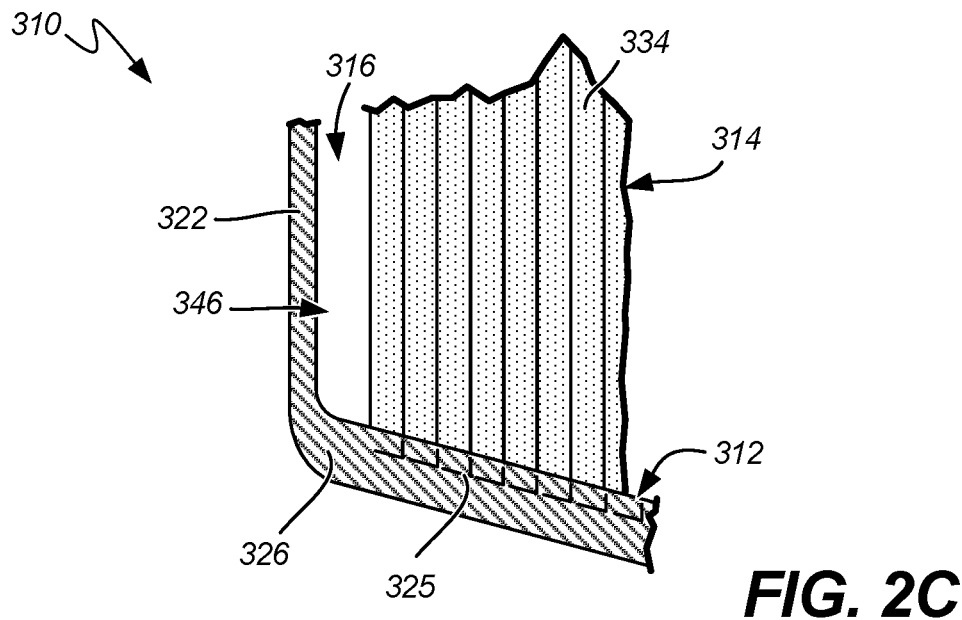
FIG. 2C is an enlarged cross-sectional side view of a fourth embodiment of the water purification system.

FIG. 2B is an enlarged cross-sectional view of a bottom portion of water purification system 210, which is similar to the water purifications described above. Water purification system 210 includes all of the components disclosed in water purification 10, except the components discussed with regards to water purification 210 are different than those in water purification system 10 in FIGS. 1A and 1B. Water purification system 210 includes housing 212 having interior space 216, walls 222, and bottom side 226 (among other components) and cartridge 214 having filter 234 and bottom cap 238 (among other components). Water purification system 210 also includes sealing material 240 and unfiltered volume 246.

As shown in FIG. 2B, bottom cap 238 does not extend radially outward the entire distance between walls 222 (as the embodiments shown in FIGS. 1A and 1A and FIG. 2A). Rather, sealing material 240 is used to fill a gap between bottom cap 238 and walls 222 so that unfiltered/unpurified water cannot flow through the gap and out of housing 212 and rather must flow through filter 234 to become filtered/purified. Sealing material 240 can be any suitable sealing material, including epoxy or caulk, that is able to be applied during manufacture of water purification system 210 and/or installation of cartridge 214 within housing 212. Sealing material 240 provides a water-tight seal between walls 222 and bottom cap 238. Sealing material 240 can be present only in the gap between bottom cap 238 and walls 222 or can also be present between bottom side 226 and bottom cap 238. However, sealing material 240 should fill the gap at least vertically up to a top surface of bottom cap 238 so that no portion of unfiltered volume 246 is present below filter 234 and unfiltered/unpurified water cannot sit/pool in the gap between walls 222 and bottom cap 238.

FIG. 2C is an enlarged cross-sectional view of a bottom portion of water purification system 310, which is similar to the water purification system described above. Water purification system 310 includes many of the components disclosed in water purification 10, but water purification system 310 does not include a bottom cap. Other than the absence of a bottom cap, water purification system 310 is similar in functionally and configuration to water purification system 10 in FIGS. 1A and 1B. Water purification system 310 includes housing 312 having interior space 316, walls 322, bottom side 326, and slots 325 (among other components) and cartridge 314 having filter 334 (among other components, but not a bottom cap). Water purification system 310 also includes unfiltered volume 346.

Water purification system 310 includes cartridge 314 that does not have a bottom cap. Instead, filter 34 can extend into slots 325 in bottom side 326, with slots 325 being formed by a bottom portion of filter 334 being embedded into bottom side 326. Housing 312 can be constructed from a material that becomes pliable when at an elevated temperature and allows filter 334 to be pressed into bottom side 326 such that slots 325 are formed in bottom side 326 as bottom side 326 forms around the bottom portion of filter 334. Once bottom side 326 solidifies, filter 334 is embedded in bottom side 326 of housing 312 and held in place. Bottom side 326 does not need to include slots 325, as filter 334 can be fastened to bottom side 326 through other means as well, including through the use of adhesive and/or a sealing material. No matter how filter 334 is fastened to bottom side 326, the connection should be substantially water tight to prevent unfiltered/unpurified water from flowing out of unfiltered volume 346 except through filter 334. With the configuration of water purification system 310 having no bottom cap and filter 334 extending to be in contact with bottom side 326 of housing 312, no portion of unfiltered volume 346 is present below filter 334 and unfiltered/unpurified water cannot sit/pool within filtered volume 334.

Water purification system 10/110/210/310 provides no portion of unfiltered volume 46/146/246/346 below a bottom of filter 34/134/234/334 so that no volume is present within which unfiltered/unpurified water can sit/pool when water is no longer provided to water purification system 10/110/210/310 (i.e., the overall water system is shut off). Therefore, water purification system 10/110/210/310 provides an outside-in purification configuration that also allows the water to drain out of the system (due to gravity) when water is no longer provided to water purification system 10/110/210/310, ensuring the system remains sanitary, functional, and undamaged (due to freezing) because water is not present within water purification system 10/110/210/310.

DISCUSSION OF POSSIBLE EMBODIMENTS

The following are non-exclusive descriptions of possible embodiments of the present invention.

An outside-in liquid purification system includes a housing and a cartridge. The housing defines an interior space and includes an inlet at a top side of the housing, an outlet at a bottom side of the housing, walls extending between the top side and the bottom side, and an unfiltered volume within the interior space. The cartridge is disposed within the interior space and includes a top cap adjacent the top side of the housing configured to direct liquid that enters the interior space to the unfiltered volume and a filter having an annular shape and extending between the top cap and the bottom side of the housing such that no portion of the unfiltered volume is below the filter. Further, the filter defines a hollow vertical column such that liquid flows from the unfiltered volume through the filter into the column and then downward out of the housing through the outlet.

The outside-in liquid purification system of the preceding paragraph can optionally include, additionally and/or alternatively, any one or more of the following features, configurations and/or additional components:

A further embodiment of the foregoing outside-in liquid purification system includes a bottom cap between the filter and the bottom side of the housing with the bottom cap extending laterally between the walls of the housing and at least one sealing ring between the bottom cap and the walls of the housing.

A further embodiment of any of the foregoing outside-in liquid purification systems, wherein the bottom cap includes an orifice at a center to allow filtered liquid within the column of the filter to flow out of the housing through the outlet.

A further embodiment of any of the foregoing outside-in liquid purification systems, wherein the walls of the housing include a stair-step at a location where the bottom cap and the at least one sealing ring interface with the walls.

A further embodiment of any of the foregoing outside-in liquid purification systems includes a bottom cap between the filter and the bottom side of the housing with the bottom cap extending laterally between the walls of the housing and a sealing material between the bottom cap and the walls of the housing.

A further embodiment of any of the foregoing outside-in liquid purification systems, wherein the sealing material is one of an epoxy or caulk.

A further embodiment of any of the foregoing outside-in liquid purification systems, wherein the sealing material is also located between the bottom cap and the bottom side of the housing.

A further embodiment of any of the foregoing outside-in liquid purification systems, wherein the filter is fastened to the bottom side of the housing.

A further embodiment of any of the foregoing outside-in liquid purification systems, wherein the filter is fastened to the bottom side of the housing using a sealing material.

A further embodiment of any of the foregoing outside-in liquid purification systems, wherein the filter is fastened to the bottom side of the housing by being embedded in the bottom side of the housing during manufacture of the outside-in liquid purification system.

A further embodiment of any of the foregoing outside-in liquid purification systems, wherein the housing is separable into at least two pieces to allow access to the interior space of the housing to allow for the cartridge to be installed within the interior space of the housing.

A further embodiment of any of the foregoing outside-in liquid purification systems, wherein the housing is constructed from one of a metal or plastic.

A further embodiment of any of the foregoing outside-in liquid purification systems, wherein a top side of the top cap is conical to direct liquid that enters the inlet towards the unfiltered volume adjacent the walls of the housing.

A further embodiment of any of the foregoing outside-in liquid purification systems, wherein the filter has an annular fan-like configuration.

A water purification system includes a housing and a cartridge. The housing defines an interior space with an inlet at a top side, an outlet at a bottom side, and an unfiltered volume adjacent walls extending between the top side and the bottom side. The cartridge within the housing has a top cap and a filter between the top cap and the bottom of the housing such that no portion of the unfiltered volume is below the filter with the filter having an annular shape defining a hollow vertical column that allows water to flow from the unfiltered volume at least partially radially inward through the filter into the column and downward out through the outlet.

The water purification system of the preceding paragraph can optionally include, additionally and/or alternatively, any one or more of the following features, configurations and/or additional components:

A further embodiment of the foregoing water purification system, wherein the cartridge further includes a bottom cap between the filter and the bottom side of the housing that extends laterally between the walls of the housing.

A further embodiment of any of the foregoing water purification systems, wherein the cartridge further includes at least one sealing ring between the bottom cap and the walls of the housing.

A further embodiment of any of the foregoing water purification systems, wherein the walls of the housing include a stair-step at a location where the bottom cap and the at least one sealing ring interface with the walls such that an inside diameter of the walls at the interface is less than an inside diameter of the walls above the interface.

A further embodiment of any of the foregoing water purification systems, wherein the cartridge further includes a sealing material between the bottom cap and the walls of the housing.

A further embodiment of any of the foregoing water purification systems, wherein the filter of the cartridge is fastened to the bottom of the housing.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An outside-in liquid purification system comprising:
    a housing defining an interior space, the housing comprising:
        an inlet at a top side of the housing;
        an outlet at a bottom side of the housing;
        walls extending between the top side and the bottom side; and
        an unfiltered volume within the interior space adjacent the walls;
    a cartridge disposed within the interior space, the cartridge comprising:
        a top cap adjacent the top side of the housing, the top cap having a top side in which most of the top side is sloped to direct liquid that enters the interior space to the unfiltered volume adjacent the walls; and
        a filter having an annular shape and extending between the top cap and the bottom side of the housing such that no portion of the unfiltered volume is below the filter, the filter defining a hollow vertical column such that liquid flows from the unfiltered volume through the filter into the column and then downward out of the housing through the outlet.

2. The outside-in liquid purification system of claim 1, wherein the cartridge further comprises:
    a bottom cap between the filter and the bottom side of the housing with the bottom cap extending laterally between the walls of the housing; and
    at least one sealing ring between the bottom cap and the walls of the housing.

3. The outside-in liquid purification system of claim 2, wherein the bottom cap includes an orifice at a center to allow filtered liquid within the column of the filter to flow out of the housing through the outlet.

4. The outside-in liquid purification system of claim 2, wherein the walls of the housing include a stair-step at a location where the bottom cap and the at least one sealing ring interface with the walls.

5. The outside-in liquid purification system of claim 1, wherein the cartridge further comprises:
    a bottom cap between the filter and the bottom side of the housing with the bottom cap extending laterally between the walls of the housing; and
    a sealing material between the bottom cap and the walls of the housing.

6. The outside-in liquid purification system of claim 5, wherein the sealing material is one of an epoxy or caulk.

7. The outside-in liquid purification system of claim 5, wherein the sealing material is also located between the bottom cap and the bottom side of the housing.

8. The outside-in liquid purification system of claim 1, wherein the filter is fastened to the bottom side of the housing.

9. The outside-in liquid purification system of claim 8, wherein the filter is fastened to the bottom side of the housing using a sealing material.

10. The outside-in liquid purification system of claim 8, wherein the filter is fastened to the bottom side of the housing by being embedded in the bottom side of the housing during manufacture of the outside-in liquid purification system.

11. The outside-in liquid purification system of claim 1, wherein the housing is separable into at least two pieces to allow access to the interior space of the housing to allow for the cartridge to be installed within the interior space of the housing.

12. The outside-in liquid purification system of claim 1, wherein the housing is constructed from one of a metal or plastic.

13. The outside-in liquid purification system of claim 1, wherein a top side of the top cap is conical to direct liquid that enters the inlet towards the unfiltered volume adjacent the walls of the housing.

14. The outside-in liquid purification system in claim 1, wherein the filter has an annular fan-like configuration.

15. A water purification system comprising:
a housing defining an interior space with an inlet at a top side, an outlet at a bottom side, and an unfiltered volume adjacent walls extending between the top side and the bottom side; and
a cartridge within the housing having a top cap with a top side in which most of the top side is sloped towards the walls and a filter between the top cap and the bottom of the housing such that no portion of the unfiltered volume is below the filter with the filter having an annular shape defining a hollow vertical column that allows water to flow from the unfiltered volume at least partially radially inward through the filter into the column and downward out through the outlet.

16. The water purification system of claim 15, wherein the cartridge further includes a bottom cap between the filter and the bottom side of the housing that extends laterally between the walls of the housing.

17. The water purification system of claim 16, wherein the cartridge further includes at least one sealing ring between the bottom cap and the walls of the housing.

18. The water purification system of claim 17, wherein the walls of the housing include a stair-step at a location where the bottom cap and the at least one sealing ring interface with the walls such that an inside diameter of the walls at the interface is less than an inside diameter of the walls above the interface.

19. The water purification system of claim 16, wherein the cartridge further includes a sealing material between the bottom cap and the walls of the housing.

20. The water purification system of claim 15, wherein the filter of the cartridge is fastened to the bottom of the housing.

\* \* \* \* \*